Figure 3:
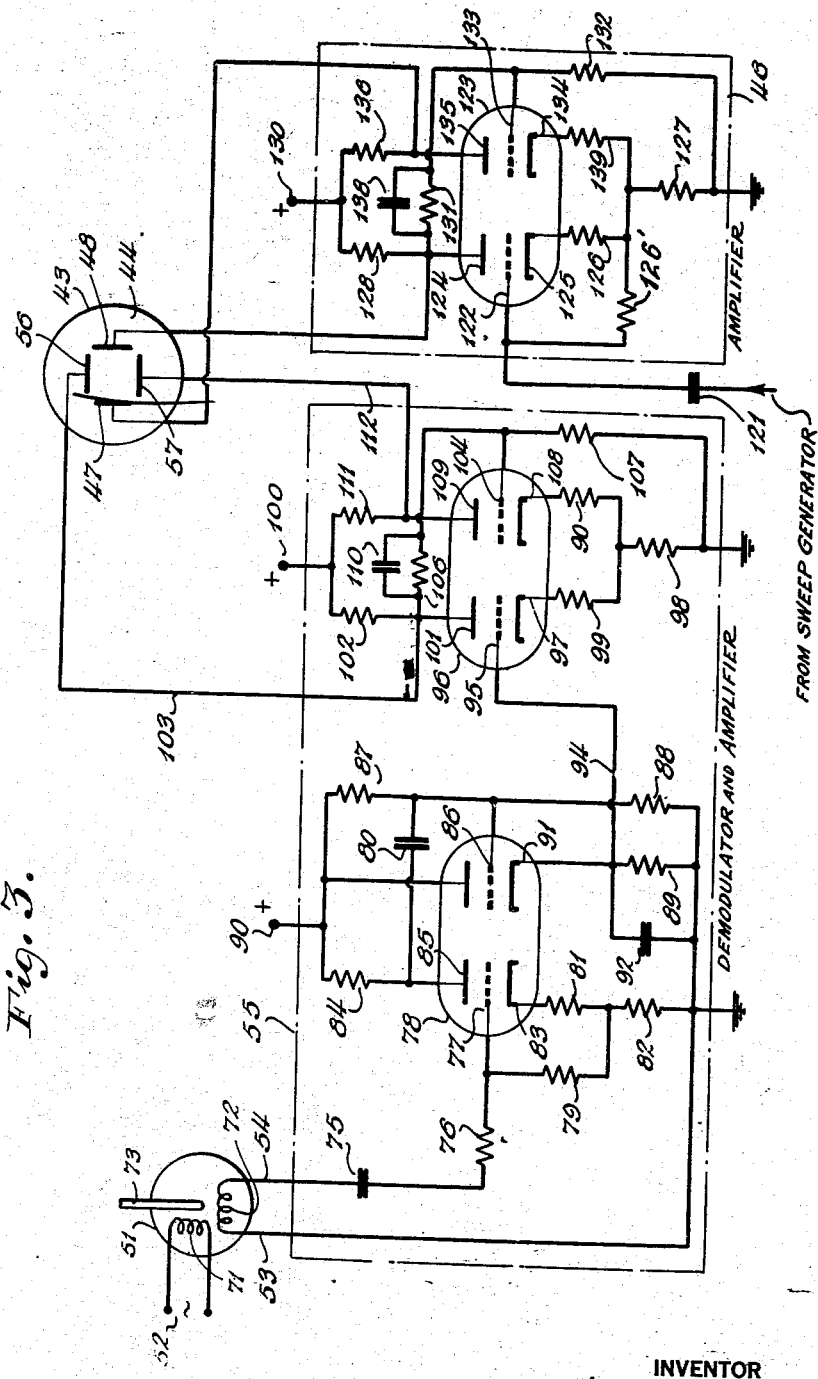

Dec. 9, 1947.                    J. E. SHEPHERD                    2,432,101
              INDICATING METHOD AND APPARATUS FOR DETECTION SYSTEMS
                        Filed April 19, 1943         2 Sheets-Sheet 1
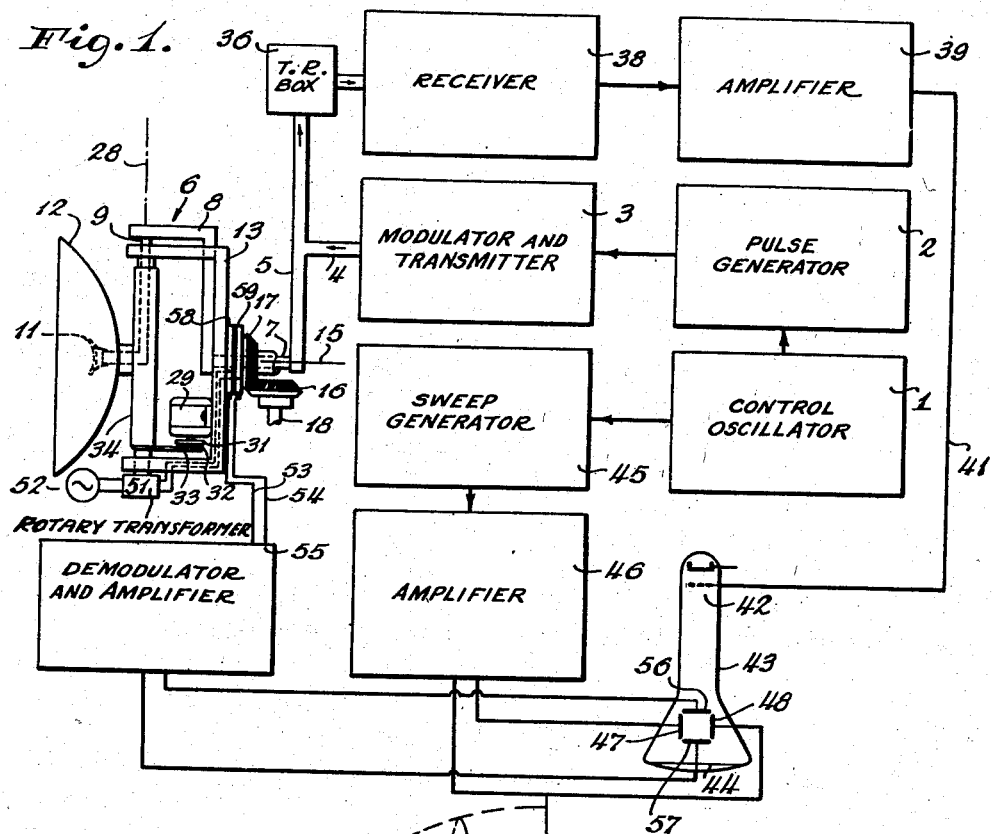
INVENTOR
JAMES E. SHEPHERD
BY
ATTORNEY Dec. 9, 1947.          J. E. SHEPHERD          2,432,101
INDICATING METHOD AND APPARATUS FOR DETECTION SYSTEMS
Filed April 19, 1943          2 Sheets-Sheet 2

INVENTOR
JAMES E. SHEPHERD
BY
ATTORNEY

Patented Dec. 9, 1947

2,432,101

UNITED STATES PATENT OFFICE 2,432,101

INDICATING METHOD AND APPARATUS FOR DETECTION SYSTEMS

James E. Shepherd, Hempstead, N. Y., assignor to Sperry Gyroscope Company, Inc., a corporation of New York Application April 19, 1943, Serial No. 483,698

11 Claims. (Cl. 343—11)

This invention relates, in general, to radio object detection systems which utilize the reflection of radio energy from an object to determine the approximate location thereof. The invention particularly relates to an indicating method and apparatus for use in a system which scans a portion of space to detect the presence of objects therein. However, some features of the invention may be used to determine the direction of any source of radio energy, and it is not intended to limit the use of the invention to the detection of reflected energy.

In systems of this type, radio energy is radiated from an antenna, reflected from an object, and received. By utilizing a directional antenna for the radiation or reception of the energy, the direction from which the energy is reflected may be determined in accordance with the position of the directional antenna at the instant that reflected energy is received. Such systems may provide for scanning the directional beam by periodically moving it over a portion of space in a manner to cover all points therein.

In addition to determining the direction of an object in accordance with the direction from which reflected energy is received, it is possible also to determine the approximate distance of the object from the system. This may be accomplished by measuring the time interval between the radiation of energy and the reception of reflections of the same energy. This information of the direction and distance of the target makes it possible to determine the exact location or orientation of the detected object relative to the system. Accurate orientation information or data may be obtained by exercising care in the design of the various elements of the system.

Although the orientation information may be complete and accurate, it is difficult to provide a visual presentation of the information so it may be used to the best advantage. In view of the nature of the signals by which the orientation information or data is obtained and the time factors involved, it has been the practice to utilize the data to control a trace on the screen of a cathode ray tube. Thus, it is necessary to show three-coordinate information on a two-coordinate surface. One method of doing this is to deflect the trace on the screen of the cathode ray tube in accordance with two of the coordinates, and to alter the pattern of the trace in accordance with the third coordinate.

An example of this method is to deflect the trace in accordance with the azimuth and elevation of the detected object, and to indicate the distance of the object by varying the width or length of the trace. Another example is to deflect the trace on the screen of the tube in accordance with the azimuth of the object and the distance thereof from the system. The elevation of the object may then be indicated by altering the slope of the trace.

The method of altering the pattern of the trace provides an observer with an indication of the third coordinate, but it is not possible for the observer to determine accurately the quantity represented by the distortion of the trace. Another method for determining three-coordinate data is to use two cathode ray tubes and to show the two coordinates on each of the tubes, one coordinate being common to both. Since one coordinate is common to both of the tubes, it is possible to correlate traces appearing on the two screens and thereby identify various objects that may be detected. One example of this method of indication is to show the azimuth and distance of the object on one screen, and the elevation and distance of the object on the other screen. Since the distance is common to both tubes, corresponding traces on the two tubes may be readily identified in accordance with the distance.

There are many factors which must be considered in selecting the method of indication which is to be used. The signals reflected from an object are comparatively weak, and hence the effect of noise is troublesome. It is possible to utilize the characteristics of some types of screens to discriminate between weak persistent signals and noise flashes. As signals become weaker as the distance of the object increases, the discrimination of signals from noise becomes increasingly difficult.

The effect of noise varies with different arrangements for scanning the beam pattern of the antenna over the portion of space covered by the system. With some types of scanning, noise flashes are superimposed upon the traces of desired signals thus making it difficult to distinguish the signals. In order to operate the system at maximum range, it is particularly desirable to avoid the superposition of noise flashes on the weaker signals.

Another feature to be considered, at least for systems operating from aircraft, is the effect of energy reflected from objects on the ground. Thus, care must be taken that the indication enables the operator to distinguish between objects on the ground and objects in the air.

Furthermore, it is desirable to present a visual indication of detected objects to an observer in a manner most nearly resembling the objects as they would appear to the observer in space. One method of accomplishing this is to have the screen of the cathode ray tube represent the portion of space being scanned by the directional beam pattern of the antenna. However, it is also desirable to present an accurate indication of the distance of the object from the observer. In most cases, this distance is a most important consideration.

In order to use the distance of the object as one coordinate, it is necessary to sweep the beam of the cathode ray tube continuously and rapidly in one direction across the screen of the tube. With the methods of scanning most commonly used, azimuth and elevation angles usually vary rapidly. For this reason, if azimuth and elevation are used as the second coordinate it is necessary to sweep the beam rapidly and continuously in the other direction over the screen of the tube. Thus, noise flashes appear almost continuously over all portions of the tube and tend to obscure weaker persistent traces representing detected objects.

One object of the invention is to provide an accurate indication of the distance of a detected object that is effective at a maximum range.

Another object of the invention is to provide an indication of detected objects in which the superposition of noise flashes on persistent traces representing the object is reduced.

A further object of the invention is to provide an object detection system having a cathode ray tube indicator in which the beam is scanned slowly in one direction across the screen of the tube.

Other objects and advantages of the invention will become apparent from the following description taken in connection with the accompanying drawings, in which Fig. 1 is a schematic block diagram of an object detection system embodying the invention;

Fig. 2 is a space diagram illustrating the manner in which the directional antenna for the system shown in Fig. 1 scans a portion of space; and Fig. 3 is a circuit wiring diagram of those components of the system which control the indicator shown in Fig. 1.

The radio detection system shown in Fig. 1 is of the pulse type in which short pulses of high frequency energy are periodically radiated, and rejections of these pulses of energy are received to detect the presence of an object.

This system has a transmitting device which includes a control oscillator 1 that is designed to generate a selected frequency. This oscillator controls a pulse generator 2 that generates short pulses at a repetition rate corresponding to the frequency of the control oscillator 1 and which are applied to a modulator and transmitter 3 for modulating high frequency radio energy. The pulses of high frequency radio energy are supplied from the modulator and transmitter 3 by means of suitable wave guides 4 and 5 to a scanner indicated generally at 6.

Thus the transmitting device includes a control oscillator, pulse generator, and transmitter, all of which are of conventional design. Various types of devices may be used without departing from the invention. Since the devices are now well known to those skilled in the art, a detailed description herein is unnecessary.

The pulse-modulated energy continues through wave guides 7, 8 and 9 in the scanner 6 to a radiating antenna 11 that is carried by the scanner, and which includes a parabolic reflector 12 for providing the antenna 11 with a highly directional beam pattern.

Bracket 13, which supports the antenna in the scanner 6, is continuously rotated about a "spin" axis 15 by suitable gearing 16 and 17 driven from a continuously rotating shaft 18. Suitable rotary joints are provided in the wave guides to permit this rotation without affecting the transmission of the high frequency energy.

The directional beam pattern of the antenna 11 has an axis coincident with the axis of the parabola 12. As the scanner spins about the axis 15, the directional beam pattern describes a cone having an apex angle depending upon the angle between the axis of the parabola 12 and the spin axis 15.

By referring to Fig. 2 it will be apparent that the directional beam pattern describes a conical path, such as that shown at 21, when the angle 22 between spin axis 15 and the axis of the parabola 12 is large. Similarly, the directional beam pattern will be moved through conical paths 24 and 25 for intermediate and small angles between the axis of the parabola and the spin axis.

By varying the angles between the axis of the parabola 12 and the spin axis 15 to adjust the conical path of the directional beam pattern of the antenna 11, the beam may be scanned over a portion of space, such as the hemisphere 26 shown in Fig. 2. It is necessary that this movement be slow as compared with the spinning of the scanner 6 in order that the directional beam pattern of the antenna 11 may cover all portions of the hemisphere 26.

In order to vary the angle between the axis of the parabola 12 and the spin axis 15 gradually, provision is made for slowly oscillating the antenna 11 and parabola 12 about a "nod" axis 28. This is accomplished by a motor 29 which continuously rotates a disc 31. A pin 32, mounted eccentrically with respect to the center of the disc 31, is connected to a link 33 which, as will be apparent, oscillates at a frequency corresponding to the rotation rate of the disc 31. Suitable gearing is provided between the motor 29 and disc 31 to make the rotation rate of disc 31 comparatively slow. The link 33 is connected by suitable mechanism (not shown) to gradually oscillate sleeve 34, which supports parabola 12 and antenna 11 about the nod axis 28. Thus, rotation of the disc 31 gradually varies the angle between the axis of the parabola 12 and the spin axis 15. Thus, as the angle between the axis of the parabola 12 and the spin axis 15 is gradually varied, the beam pattern describes a series of conical paths, the number of which depends upon the number of revolutions the scanner makes about the spin axis 15 for each oscillation of the parabola 12 about the nod axis.

Although the beam pattern actually describes a spiral, each revolution of the scanner about the spin axis 15 causes the beam pattern to move through an approximately conical path having an apex angle depending upon the nod angle of the parabola.

Energy reflected from an object is received by the antenna 11 and transmitted through wave guides 9, 8, 7 and 5 to a T—R box 36. This T—R box 36 is of conventional design and includes a device for discriminating between the strong pulses of energy developed by transmitter 3 and the relatively weaker pulses of reflected energy which are received by antenna 11. The T—R box blocks the transmitted pulses but passes the weak pulses to a receiver 38. The receiver 38 may be of any suitable conventional design to develop a signal in accordance with the reception of signals received by the antenna 11. Thus, signals are produced corresponding to the reception of reflected energy pulses which are received.

However, signals are also produced corresponding to extraneous noise received by the antenna 11 and/or developed in the system itself. Suitable devices may be employed for increasing the signal-to-noise ratio; however, it is not believed that the complete elimination of noise has, as yet, been accomplished.

The signals developed by the receiver 38 are amplified by amplifier 39 and supplied by means of a suitable connector 41 to the control grid 42 of a cathode ray tube 43. The grid 42 is normally biased to cut off the electron beam in the tube 43. Signals supplied from connector 41 adjust the bias of a grid 42 to permit passage of the electron beam, thereby causing a trace to appear on screen 44 of tube 43.

The position of the trace on the screen of the tube is determined by the distance of the detected object and by the position of the path described by the directional beam pattern of the antenna 11 at the time the reflected energy is received, as will hereinafter be described.

The distance of the detected object may be determined by measuring the time between the radiation of pulses of energy and the reception of reflected pulses. Thus, by sweeping the electron beam of the tube 43 across the screen at a given rate after the radiation of each pulse of energy, the position of the trace caused by the reception of a reflected energy pulse indicates the distance of the object which reflected the pulse. To accomplish this sweeping of the electron beam, control oscillator 1 actuates a sweep generator 45 of suitable and conventional design to develop a saw-tooth wave having the same frequency as that of the control oscillator 1.

This saw-tooth wave voltage developed by the sweep generator is utilized to control an amplifier 46, which applies the voltage to the horizontal deflection plates 47 and 48 of the cathode ray tube 43 in a manner that causes the electron beam to sweep across the screen 44 at a predetermined rate following the radiation of each pulse of energy by the antenna 11.

A position transmitter in the form of a rotary transformer 51 has its stator supplied from a suitable source of alternating current 52. The rotor of this transformer is positioned in accordance with the nod position of the scanner; that is, the angle between the axis of the parabola 12 and the spin axis 15. Thus, a voltage is induced in the rotor of the transformer 51 proportional to the position of the path being described by the directional beam pattern at any given instant.

This voltage is supplied through suitable slip rings 58 and 59 and leads 53 and 54 to actuate a suitable demodulator and amplifier 55. The amplifier 55 develops voltages that are applied to the vertical deflection plates 56 and 57 of the cathode ray tube 43 in a manner to cause the electron beam to move vertically over the screen 44 as the path of the directional beam pattern is varied. Any suitable type of signal generator could be substituted for the rotary transformer 51. For example, a D. C. signal could be developed by a rotary potentiometer and the voltage applied directly to the vertical plates of the cathode ray tube, thus eliminating the amplifier 55.

The trace caused by the reception of reflected energy is thus positioned horizontally on the face of the cathode ray tube in accordance with the distance of the object detected and vertically in accordance with the nod angle of the parabola at the instant the reflected energy is received.

Referring now to Fig. 2, it will be apparent that the displacement of the indication on the screen 44 of the cathode ray tube 43 determines the location of the detected object as a circle on the surface of a cone having a given apex angle, and at a given distance from the apex of the cone. Thus, if the directional beam pattern is moving through a path corresponding to the cone 21, the location of a detected object may be indicated as a circle 61 on the surface of the cone 21 and at a distance 62 from the apex of the cone corresponding to the distance of the object from the antenna 11. Similarly, the location of the detected object may be determined as circles 63 and 64 on the smaller cones 24 and 25, respectively, and at varying distances from the apex of these cones.

The system shown in Fig. 1 utilizes the antenna 11 for both the radiation and reception of energy. This is a very efficient arrangement in that the directional beam pattern of the antenna 11 is used for both the radiation and reception of energy. For this reason a maximum percentage of radiated energy is reflected to the antenna. However, it is not necessary that the same antenna be used for both radiation and reception, nor is it necessary that both the radiating and receiving antennae be directional.

If separate antennae are used for radiation and reception, either one or both of them may be directional and be scanned over the portion of space being searched by the system. It is only necessary to know the direction of the directional beam pattern of one of the antennae in order to determine the direction from which energy is reflected by an object. However, particular antenna design is not material to the present invention as it is contemplated that the directional beam pattern of either one or both of the antennae may be scanned over the portion of space being searched.

The invention also has application in other types of systems. For example, it may be used to determine the location and distance of any source of energy. It is not necessarily limited to detecting a source of reflected energy.

One such application is in beacon systems wherein a signal is radiated by a transmitting source. The scanner determines the location of the source by indicating the direction from which the energy is received. By synchronizing the transmitter and receiver, as by a synchronizing transmitter at the receiver, it is possible to determine the distance between transmitter and receiver. The sweep circuit for the cathode ray would be controlled by the synchronizing transmitter. The position of the scanning path would determine the second position of the cathode ray. Thus a received signal would cause an indication to appear on the screen of the tube in the same manner as that described in connection with the reflection type detection system.

The circuits for deflecting the electron beam of the cathode ray tube are shown in detail in Fig. 3. As previously explained, stator winding 71 of the rotary transformer 51 is connected to a suitable source 52 of alternating current having a constant frequency. Rotor winding 72 of the rotary transformer 51 is rotated by a shaft 73 in accordance with the nod angle of the antenna 11. Thus a voltage is induced in rotor winding 72 having a frequency corresponding to the frequency of the source 52 and an amplitude depending upon the position of the path of the directional beam pattern as determined by the nod angle.

This voltage, as previously described, is supplied to the demodulator and amplifier 55 by leads 53 and 54, and is coupled by a condenser 75 and resistor 76 to grid 77 of one side of a double triode 78, where it is amplified. The circuit of the double triode includes a grid resistor 79, a cathode biasing resistor 81, and a resistor 82 in the circuit of a cathode 83.

A positive voltage from a suitable source 90 is supplied through load resistor 84 to plate 85. The voltage across the load resistor 84 is varied in accordance with the amplitude variations of the voltage induced in the rotor winding 72 and is coupled by means of a condenser 80 to grid 86 of an infinite impedance detector including the other half of the double triode 78. The potential of grid 86 is determined by resistors 87 and 88 and source 90. The potential of cathode 91 is determined by biasing resistor 89. The size of resistor 89 is so chosen that grid 86 is normally biased approximately to the point at which the electron flow is cut off. In this manner, the infinite impedance detector rectifies the voltage applied to grid 86, and the voltage appearing across resistor 89 in the circuit of cathode 91 has a direct current voltage component which varies in accordance with the nod angle of the antenna 11.

A condenser 92 is connected across the resistor 89 and is so chosen that it will smooth variations in the voltage across resistor 89 occurring at the frequency of the course 52, but will not affect the slower variations caused by the movements of the rotor winding 72.

This varying direct current voltage across resistor 89 is applied directly by connector 94 to a grid 95 of a double triode 96 which acts as a direct current amplifier.

Since the voltage applied to the grid 95 is the same as the voltage of cathode 91, cathode 97 of the tube 96 must be raised to a higher potential in order to provide a suitable bias. This is accomplished by resistors 98 and 99 which are chosen of a suitable value to raise the cathode to the desired potential relative to the potential of the grid 95. A positive voltage from a suitable source 100 is applied to plate 101 through a suitable load resistor 102. Variations in voltage applied to the grid 95, due to changes in the position of the path of the directional beam pattern, cause current variations in the circuit of the plate 101 and corresponding voltage changes across the load resistor 102. The voltage applied to the plate 101 is the same as the voltage applied by lead 103 to the upper plate 56 of the cathode ray tube 43. Thus, as the voltage applied to grid 95 increases, the voltage applied to the upper deflection plate 56 of the cathode ray tube 43 decreases.

These voltage variations are also applied across grid resistors 106 and 107 which control the voltage applied to grid 104.

A condenser 110 is connected between plate 101 and grid 104. The size of this condenser is so chosen that the ratio of its capacity to the inherent capacity of the grid 104 and cathode 108 is the same as the ratio of resistor 106 to resistor 107. In this manner the A. C. and D. C. voltages at plate 101 are applied to grid 104 in the same proportion.

The bias of grid 104 is determined by resistors 90 and 98 in the circuit of cathode 108. As the voltage applied to the upper deflection plate 56 decreases, the voltage applied across the resistors 106 and 107 also decreases, thereby reducing the voltage applied to grid 104. This reduction in grid voltage reduces the current in the path of the double triode 96 controlled by the grid 104. Positive voltage is applied to plate 109 from the source 100 through load resistor 111. Hence, the voltage drop across the load resistor 111 decreases, and the voltage applied to the plate 109 and the lower plate 57 of the cathode ray tube 43 by connector 112 is increased.

It will be apparent that an increase in the voltage applied to the grid 95 will cause the electron beam of the cathode ray tube 43 to move downwardly, since the potential of the upper plate 56 decreases and the potential of the lower plate 57 simultaneously increases. Therefore, as the nod angle of the antenna 11 changes the apex angle of the path of the directional beam pattern, the electron beam of the cathode ray tube 43 is deflected in a vertical direction. By adjusting the position of the rotor winding 72 it is, of course, possible to make the electron beam of the cathode ray tube 43 move either upwardly or downwardly as the nod angle increases.

The electron beam is positioned vertically in accordance with the apex angle of the conical path of the directional beam pattern of the antenna 11. Hence, a trace on the screen 44 of the tube, caused by the reception of reflected energy by receiver 38, will appear in a vertical position corresponding to the position of the conical path, that is, the size of the apex angle.

As previously explained, the electron beam of the cathode ray tube 43 is positioned horizontally in accordance with the elapsed time from the transmission of each pulse of high frequency energy. The control oscillator 1 actuates the sweep generator 45 to produce a saw-tooth wave having the same frequency as that of the control oscillator, and, therefore, the same frequency as the repetition rate of radiated pulses. This saw-tooth wave is supplied to the amplifier 46 where it produces a voltage varying at a predetermined rate. This varying voltage is applied to the horizontal plates 47 and 48, thereby causing the electron beam of the tube 43 to sweep horizontally across the screen of the tube at a predetermined rate after the transmission of each pulse of energy.

The time relation of the voltage change is so arranged, that the voltage begins to change immediately following the radiation of each energy pulse.

The saw-tooth voltage output of the sweep generator 45 is coupled by a condenser 121 to grid 122 of a double triode amplifier 123. Suitable bias for the grid 122 is provided by resistors 126, 126' in the circuit of cathode 125. A positive voltage is supplied to plate 124 from a suitable source 130 through a load resistor 128.

A voltage corresponding to the changing voltage applied to the grid 122 appears across the load resistor 128 and is applied to the right-hand horizontal deflecting plate 48 of the tube 43. Assuming that the saw-tooth voltage applied to grid 122 decreases at a predetermined rate, the voltage applied to the deflecting plate 48 increases at the same rate. This same voltage is also applied across resistors 131 and 132 which determine the potential of grid 133. A condenser 138 is connected between plate 124 and grid 133, and serves the same purpose as the condenser 110. The bias of grid 133 is determined by cathode biasing resistors 127 and 139.

As the voltage applied to deflecting plate 48 increases, the voltage applied to the grid 133 also increases and the current in the circuit of the double triode 123, including cathode 134 and anode 135, increases. This current increase results in an increased drop across load resistor 136, thereby reducing the potential applied to the left-hand deflecting plate 47 of the tube 43.

It will be apparent, therefore, that a decrease in voltage across the condenser 121 as applied to the grid 122 will cause a decrease in the voltage applied to the left-hand deflecting plate 47, and an increase in the voltage applied to the right-hand deflecting plate 48, thereby sweeping the electron beam from left to right across the screen 44 as it appears in Fig. 3.

Although the circuit shown in Fig. 3 uses double triodes, it should be understood that any types of tubes may be substituted in the circuit without departing from the invention. For example, either single triodes or pentodes may be substituted for each side of the double triodes shown in Fig. 3.

The saw-tooth wave applied to grid 122 has a frequency corresponding to the repetition rate of transmitted pulses. Therefore, the electron beam of the tube 43 sweeps horizontally across the tube at the same frequency as the repetition rate of the transmitted pulses and the time relation of the voltages applied to the horizontal deflecting plates 47 and 48 is so adjusted that the beam will begin its sweep immediately following the radiation of each pulse.

The velocity of the horizontal sweep of the electron beam is chosen to deflect the beam from one side of the screen 44 to the other within the time interval required for radiated energy to be reflected from an object at the maximum range of the system, so the position of the beam at any instant is proportional to the time elapsed after the transmission of each pulse. Therefore, a trace appearing on the screen 44 of the tube 43 is positioned horizontally in accordance with the distance of the object from which energy is reflected.

From the foregoing description it may be seen that the reception of energy reflected from an object causes a trace to appear on the screen 44 of the cathode ray tube. This trace is positioned vertically in accordance with the apex angle of the path described by the directional beam pattern of the antenna 11 at the time the reflected energy is received, and is positioned horizontally in accordance with the distance of the object from the antenna 11.

The antenna 11 is moved rapidly to cause the directional beam pattern thereof to describe a predetermined path. The scanner shown in Fig. 1 causes the antenna to describe a path in the form of a cone that has an apex angle depending upon the angle between the longitudinal axis of the parabolic reflector 12 and the spin axis 15 of the scanner. The path described by the directional beam pattern is varied slowly to cause the beam pattern to scan completely an entire portion of space. This slow movement of the path is accomplished by slowly varying the nod angle, that is, the angle between the longitudinal axis of the parabola and the spin axis of the scanner.

By using the position of the path described by the directional beam pattern as one coordinate for the indicator, the electron beam of the cathode ray tube is scanned slowly in one direction. The other coordinate, representing the distance of an object from the antenna, must cause the electron beam to scan the screen rapidly in another direction.

Noise either received by the antenna or produced within the system will cause flashes to appear on the screen, depending upon the position of the electron beam. However, since the electron beam is scanned slowly in one direction, these noise flashes will appear on various portions of the screen only once during each complete scanning cycle. Since these noise flashes are not likely to occur at the same instant during successive cycles, the flashes quickly disappear.

The reception of reflected energy causes a trace to appear on the screen in substantially the same position during successive scanning cycles. Although the received signals may be comparatively weak, their repeated appearance on the screen causes a dull persistent glow that may be distinguished from the noise flashes. Even very weak signals may be discerned because they persist after the noise flashes on a particular portion of the screen have disappeared. It will be apparent, therefore, that the use of a slowly varying parameter of the scanning movement extends the utility of detection systems to their maximum range.

In the system shown in the drawings, the electron beam moves rapidly in a horizontal direction defining a series of horizontal lines, and moves slowly in a vertical direction which gradually changes the position of the horizontal lines. Extraneous noise signals will cause flashes to appear along the lines defined by the beam. However, these flashes have a different appearance from traces due to persistent signals representing energy reflected from a target.

The electron beam is scanned slowly in a vertical direction and the flashes due to noise disappear shortly after the beam leaves the point at which the noise occurred. However, the glow of persistent signals representing the detected object continues after the beam leaves the point representing the position of the object. Since the position of the conical path of the directional beam pattern of the antenna changes comparatively slowly, the use of this position as one coordinate for the indicator permits the use of the system to detect objects at greater distances because weaker signals may be discerned more readily from noise flashes.

Although the system herein described scans a portion of space in spiral fashion, it is contemplated that the invention may be used with other types of scanners. In almost all types of scanners which cover a solid angle of space with a directional beam pattern, the pattern is moved rapidly to describe a certain path, and the position of the path is moved slowly, whereby the entire solid angle is scanned.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radio detection system having a scanner for rapidly moving the directional beam pattern of an antenna over a predetermined periodically retraced path comprising the surface of a cone and for slowly varying the position of said path for spirally scanning said beam pattern over a portion of space, an indicator comprising a cathode ray tube, a receiver responsive to the reception by said antenna of energy radiated from an object for causing a trace to appear on the screen of said tube, means for positioning said trace in accordance with the distance of the object from said antenna, and means controlled by the slowly varying movements of said beam pattern for further positioning said trace in accordance with the apex angle of said conical surface path.

2. A radio detection system comprising a device for transmitting energy, a device for receiving energy radiated from an object, means for rapidly moving a directional beam pattern of an antenna for one of said devices over a predetermined closed conical path and means for slowly varying the position of said path for spirally scanning said beam pattern over a portion of space, a cathode ray tube, means responsive to the reception of energy by said receiving device for causing a trace to appear on the screen of said tube, a sweep circuit controlled by said transmitting device for applying a signal to deflecting devices of said tube to position said trace in one direction in accordance with the distance of said object from said antenna, means actuated by said slowly varying means for developing a signal corresponding to the angular position of said path, and a circuit for applying said signal to other deflecting devices of said tube to position said trace in a different direction in accordance with the angular position of said conical path.

3. A radio detection system comprising a transmitting device for generating radio energy, a receiving device for detecting energy radiated from an object, an antenna having a directional beam pattern for one of said devices, means for rapidly spinning said beam pattern about an axis to describe a conical path, means for slowly nodding said antenna about an axis perpendicular to said spinning axis for causing said beam pattern to spirally scan a portion of space, an indicator, means connected to said receiving device for actuating said indicator to indicate the presence of an object, means for adjusting said indicator according to the range of the object, and means connected to said nodding means for further adjusting said indicator according to the apex angle of said conical path.

4. A radio detection system comprising a transmitting device for generating radio energy, a receiving device for detecting energy radiated from an object, an antenna having a directional beam pattern for one of said devices, means for rapidly spinning said beam pattern about an axis to describe a conical path, means for slowly nodding said antenna about an axis perpendicular to said spinning axis for causing said beam pattern to spirally scan a portion of space, an indicator, means connected to said transmitting device and said receiving device for adjusting said indicator according to the range of the object, and means connected to said nodding means for further adjusting said indicator according to the apex angle of said conical path.

5. In a radio detection system having a scanner for rapidly spinning the directional beam pattern of an antenna about an axis to describe a conical path and for slowly nodding said beam pattern about an axis perpendicular to said spin axis to cause said beam pattern to spirally scan a portion of space by varying the apex angle of said path, an indicator comprising a cathode ray tube, a receiver responsive to the reception of energy radiated from an object for causing a trace to appear on the screen of said tube, means for positioning said trace in accordance with the distance of said object from said antenna, and means controlled by said nodding action of said scanner for further positioning said trace in accordance with the apex angle of said conical path.

6. A radio detection system comprising a device for transmitting energy, a device for receiving energy radiated from an object, means for rapidly spinning the directional beam pattern of an antenna for one of said devices about an axis to describe a conical path and means for slowly nodding said antenna about an axis perpendicular to said spinning axis for causing said beam pattern to spirally scan a portion of space by varying the apex angle of said conical path, a cathode ray tube, means responsive to the reception of energy by said receiving device for causing a trace to appear on the screen of said tube, means for positioning said trace according to the range of the object, means for developing a signal corresponding to the apex angle of said conical path, and means responsive to said signal for further positioning said trace in accordance with said apex angle.

7. A radio object detection system comprising a device for transmitting energy, a device for receiving energy radiated from an object, means for rapidly spinning the directional beam pattern of an antenna for one of said devices about an axis to describe a conical path and means for slowly nodding said antenna about an axis perpendicular to said spinning axis for causing said beam pattern to spirally scan a portion of space by varying the apex angle of said conical path, a cathode ray tube, means responsive to the reception of reflected energy by said receiving device for causing a trace to appear on the screen of said tube, means responsive to said transmitting device for positioning said trace in one direction in accordance with the distance of said object from said antenna, means controlled by said slowly nodding means for developing a signal corresponding to said apex angle, and means responsive to said voltage for positioning said trace in another direction in accordance with said apex angle.

8. A radio detection system comprising a transmitting device for generating radiant energy, a receiving device for detecting energy radiated from an object, an antenna having a directional beam pattern for at least one of said devices, means for rapidly moving said beam pattern over a predetermined path forming a solid angle, means for slowly varying the position of said path to cause said beam pattern to scan a portion of space, means for measuring the distance of the object from said antenna, and an indicator connected to said distance measuring means and to said slowly varying means for indicating the presence of said object in terms of its distance from said antenna and the position of said path.

9. A radio detection system comprising, a transmitting device for generating radiant energy, a receiving device for detecting energy radiated from an object, an antenna having a directional beam pattern for at least one of said devices, means for rapidly turning said beam pattern about an axis, means for slowly varying the angular relationship between said beam pattern and said axis to cause said beam pattern to scan a portion of space, means for measuring the distance of the object from said antenna, and an indicator connected to said distance measuring means and said slowly varying means for indicating the presence of said object in terms of its distance from said antenna and said angular relationship.

10. A radio detection system comprising a transmitting device for generating radiant energy, a receiving device for detecting energy radiated from an object, an antenna having a directional beam pattern for at least one of said devices, means for rapidly turning said beam pattern about an axis to describe the predetermined path, means for slowly varying the angular relationship between said beam pattern and said axis to cause said beam pattern to scan a definite portion of space, an indicator, means connected to said transmitting device and said receiving device for adjusting said indicator according to the range of the object, and means connected to said slowly varying means for further adjusting said indicator according to said angular relationship.

11. In a radio detection system having a scanner for rapidly turning a directional beam pattern of an antenna about a first axis to describe a conical path and for slowly varying the angular relationship between said beam pattern and an axis at right angles to said first axis to cause said beam pattern to scan a definite portion of space, an indicator comprising a cathode ray tube, a receiver responsive to the reception of energy radiated from an object and connected for causing a trace to appear on the screen of said tube, means for positioning said trace in accordance with a distance of said object from said antenna, and means controlled by said slowly varying action of said scanner for further positioning said trace in accordance with the said angular relationship.

JAMES E. SHEPHERD.

REFERENCES CITED

The following references are of record in the file of this patent:

UNITED STATES PATENTS

| Number | Name | Date |
| --- | --- | --- |
| 2,231,929 | Lyman | Feb. 18, 1941 |
| 2,298,476 | Goldsmith | Oct. 13, 1942 |

FOREIGN PATENTS

| Number | Country | Date |
| --- | --- | --- |
| 542,634 | Great Britain | Jan. 21, 1942 |
| 520,778 | Great Britain | May 3, 1940 |